A. B. EARLE.
Straw Cutter.
No. 8,753.
2 Sheets—Sheet 1.
Patented Feb. 24, 1852.
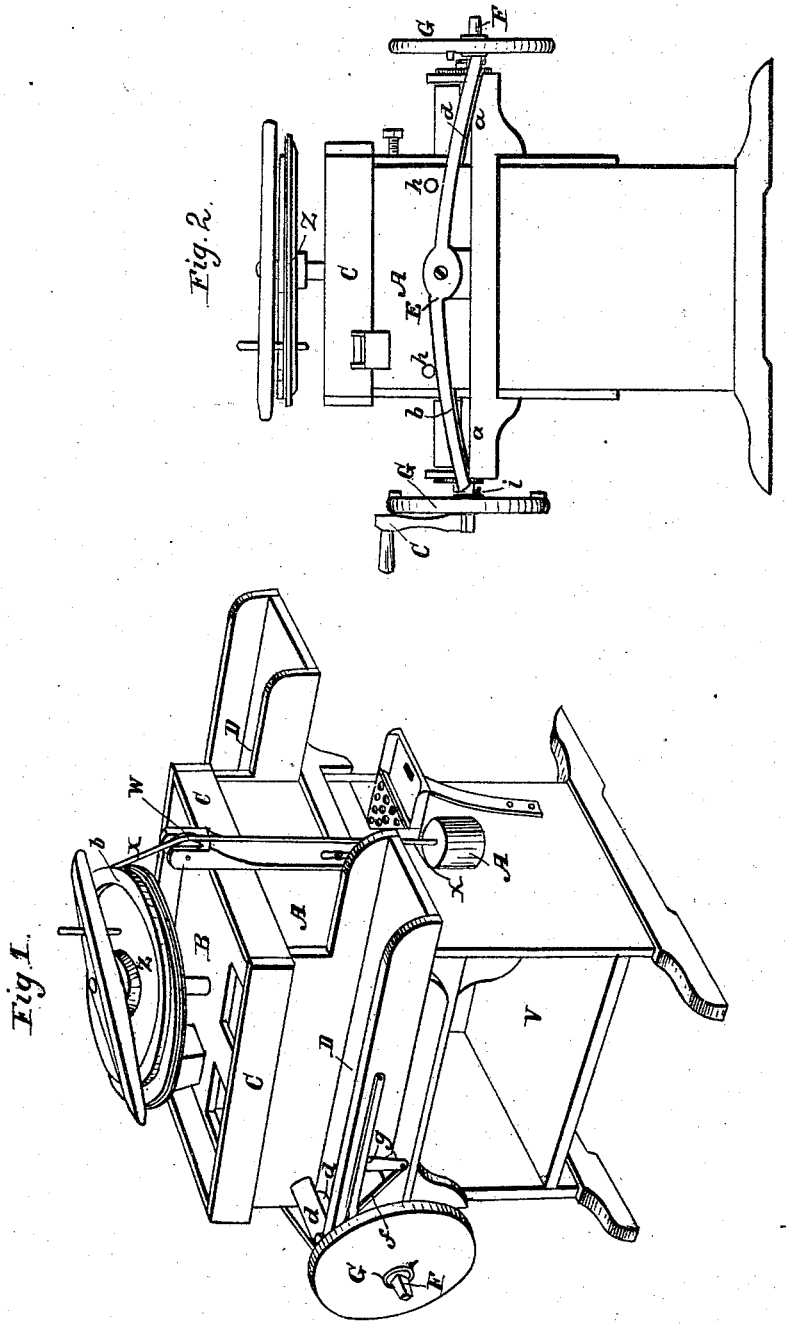

2 Sheets—Sheet 2.

A. B. EARLE.
Straw Cutter.

No. 8,753.

Patented Feb. 24, 1852.

UNITED STATES PATENT OFFICE.

ABSALOM B. EARLE, OF ONEONTA, NEW YORK.

IMPROVEMENT IN STRAW-CUTTERS.

Specification forming part of Letters Patent No. 8,753, dated February 24, 1852.

*To all whom it may concern:*

Be it known that I, ABSALOM B. EARLE, of Oneonta, in the county of Otsego and State of New York, have invented certain new and useful Improvements in Engines for Treating Vegetable Substances; and I do hereby declare that the following is a full, clear, and exact description of my said invention, reference being had to the accompanying drawings, which form part of this specification, and in which—

Figure 3:
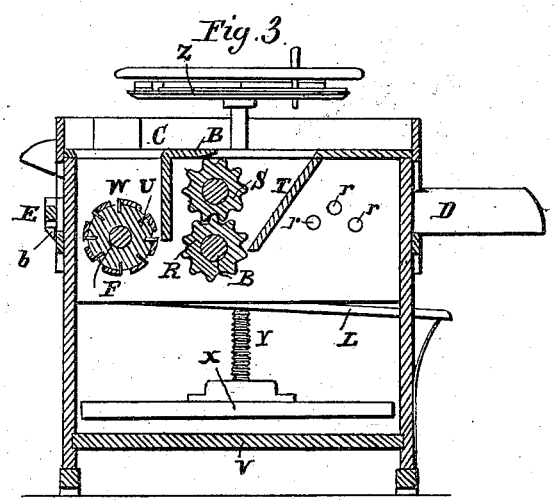
Figure 4:
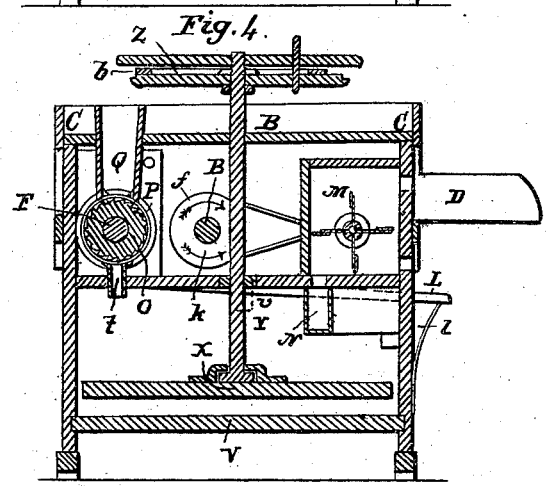
Figure 5:
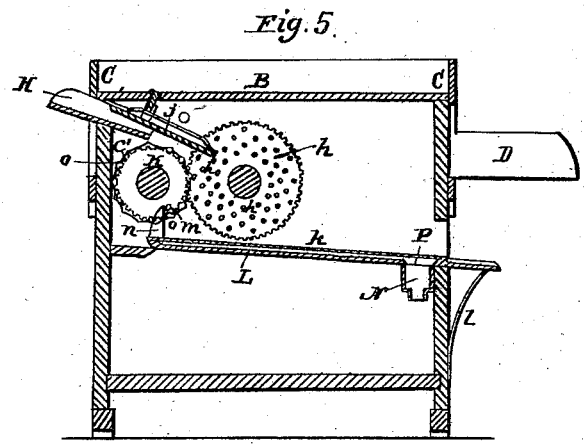

Figure 1 represents a view in perspective of my vegetable-engine complete. Fig. 2 is an end view of the same; and Figs. 3, 4, and 5 are vertical longitudinal sections of the machine at different parts of its breadth.

My claims to this machine for the purposes of this patent are confined to the chopping apparatus, the knives of which have a peculiar action given to them, which is a compound of the punching or percussion and of the shearing cuts, and which is found greatly to increase their efficiency and the ease with which they work, especially in cutting wet hay or straw, which it is well known can only be cut with great difficulty with the knives in ordinary use unless they are newly sharpened with a very fine edge. The other apparatus which I have designed in connection with my cutting-knives to increase the general usefulness of the machine are capable of rasping, grinding, and pressing vegetable substances to increase their value as food for animals and for other purposes.

The several members of the apparatus are all secured to a strong frame A, portions of which are cased in to form hoppers for receiving the various substances to be acted upon and to constitute the framing which supports the interior mechanism of the machine.

The several acting members of the machine are all put in operation by means of a single driving-shaft B, which extends transversely through the casing, is supported in suitable boxes, and is fitted at one extremity with a crank C, by means of which it may be conveniently operated by hand.

The apparatus for cutting or chopping straw, hay, and other substances, and for slicing roots, consists of a double-acting chopping-lever acting in connection with two sets of feeding-troughs. These troughs D D are situated at the opposite sides of the machine. Their extremities $a\ a$ are faced with iron or steel to form stationary knives, against which the chopping-knives work. These knives $b\ b$ are secured to the opposite arms of the lever-beam E, which is pivoted at its center to the end of the main frame. The knives $b\ b$ are secured to the lever E in such a position that as they pass the stationary knives $a\ a$ the cutting-edges of the two shall be presented to each other at an angle of about fifteen degrees. The ends of this knife-lever project beyond the feed-troughs and are struck alternately by revolving tappets. These tappets are secured to the faces of two wheels G, which are secured to the opposite ends of a shaft F. The latter passes transversely through the frame beneath the feed-troughs, is supported in suitable boxes, and is driven from the driving-shaft by means of a pair of cog-wheels $c\ c'$, contained within the case. The tappets upon the wheels are so arranged with respect to each other that those upon one wheel are opposite the spaces upon the other, so that the tappets in their revolution act alternately to strike down the extremities of the lever-beam by a sudden blow, and when one extremity of the beam is depressed the other is correspondingly raised. The feed-troughs are each fitted with a pair of feed-rollers $d\ d$. The lower roller of each pair projects upward through a slot in the bottom of its respective feed-trough, and its outer gudgeon is fitted with a ratchet-wheel $e$, which is caused to revolve and turn the roller by means of a finger $f$. The latter is pivoted to a lever $g$, which is alternately raised and allowed to drop by the action of pins $i$, secured to the face of the adjacent tappet-wheel G. These pins are in such positions with respect to the tappets that the roller is turned to force forward the straw lying upon it when the adjacent arm of the lever-beam and the chopping-knife secured thereto is being moved upward by the action of the tappet upon the opposite tappet-wheel. The upper roll of each pair lies upon the lower, its journals are fitted into vertical slots in the sides of the trough, which permit the roller to rise and fall as the quantity of straw, &c., introduced into the trough is increased or diminished. The sudden blow given to the end of the knife-lever by a tappet causes the adjacent knife to descend and chop into the substance being operated on, like an ax, and with great force, as it is driven by the momentum due to its own weight, the momentum of the tappet-wheel, and also that of the knife on the opposite end of the lever, which rises as suddenly as the acting knife descends. This part of the action of the knives is literally chopping; but as the edges of the knives on the lever cross the edges of the stationary knives at the mouths of the feed-troughs, like the blades of shears, at an angle of about fifteen degrees, this introduces the shearing element and modifies the percussive action of the cut, so as to convert it into what may be termed a "drawing-chop cut," which will, even if the cutting-edges are quite obtuse, sever with great facility such substances as machines of this kind are ordinarily employed to cut.

The interior of the case is divided transversely into three compartments by means of suitable vertical partitions. One of these contains the corn-sheller, which consists of a feed-spout, into which the corn is fed, of the apparatus for stripping the grain from the cob, and of an apparatus for cleansing the shelled corn. The feed-spout H is fitted with an adjustable spring-top $j$, which holds the ears firmly while under the action of the shelling apparatus. The latter consists of a wheel K, which is secured to the shaft F, and whose periphery is studded with teeth $o$ $o$, which draw the ear into the machine, and of a series of teeth $h$, which are secured to the face of the cog-wheel $c$ and which act to tear the grain from the ear. The shelled corn and the cobs fall upon an inclined riddle $k$ beneath, to which a rapid reciprocating movement or shaking is imparted by means of a tappet $m$ and spring $l$. The tappet $m$ is secured to the face of the wheel K, and, acting upon a standard $n$, secured to the riddle, tends to draw the latter inward, while the spring $l$, acting upon the outer extremity of the riddle, forces it outward whenever the tappet in its movement passes the extremity of its standard. The riddle $k$ is secured to a trough L, into which the shelled corn passing through the riddle drops, while the cobs are delivered at the end of the riddle and the chaff and the lighter fragmentary portions of the cob are blown off by a current of air introduced into the trough below the riddle through an orifice $p$. This current of air or blast is generated by a fan M, which is situated in the middle compartment of the case and is driven by a belt, which encircles suitable pulleys secured, respectively, to the driving-shaft B and to the fan-shaft. Air is supplied to the fan-wings through suitable openings $r$ in the partitions of the case, and the blast generated by it is conducted by a pipe to the orifice in the trough.

The grinding apparatus consists of a conical grinder O, which is secured to the shaft F and revolves with it, and of an adjustable stationary concave grinder P, which encircles the grinding-cone and can be moved along the shaft F to set its grinding-surface at a greater or less distance from that grinding-cone O in the usual manner by means of a screw $m$. This grinding apparatus is surmounted by a hopper Q, into which the substances are introduced and from which they pass into the grinding apparatus through an opening formed for the purpose in the concave. They are discharged when ground through a suitable spout $t$, secured to the lower side of the concave.

The crushing apparatus consists of two toothed or fluted rollers R S, one R of which is secured to the shaft B and revolves with it, while the other S is driven by the first one. These fluted rollers extend across the compartment in which they revolve. In front of them is an inclined board T, forming with the sides of the compartment a hopper, into which the apples or other substances to be crushed are placed. As the rollers revolve, these substances are drawn in between them and are crushed by the indentation of the projections or ribs of one cylinder into the corresponding depressions or grooves of the other. The crushed substances are delivered at the hinder sides of the rollers and drop into a tub or other receptacle placed beneath the cylinders to receive them.

The rasping apparatus consists of a drum U, which is secured to the shaft F, and whose periphery is studded with teeth. This rasping-cylinder is situated in a compartment W, adjoining the crushing-rollers, and it delivers the torn or rasped substances into some suitable receptacle placed beneath.

The press consists of a stationary platen V, which forms the lower part of the main frame, and of a movable platen, which is forced downward or toward the stationary platen by means of a screw Y. The latter turns in a nut $v$, secured in a cross-bar of the main frame, and is guided by passing its shank through the top of the machine. The head of this screw is fitted with a disk-plate Z, to which a cord $x$ is fitted. This cord is passed over a pulley $w$, secured to a standard at one end of the machine, and is attached to a weight by means of which the turning of the screw, and consequently the compression of the materials between the two platens, is continued as they yield to the pressure. The upper face of this disk has a spiral ledge $b$ upon it, round which the cord is passed in such manner that as the screw turns under the action of the weight the cord leads from portions of the spiral ledge successively more distant from the screw, by which means the length of the lever upon which the weight acts, and consequently the force it exerts upon the screw, is increased. This graduation of the pressure is of importance in many cases where articles subjected to the press will not at first bear the full strain of the press, but which as they are compressed will withstand a greater pressure.

The top B of the frame is surrounded by a raised rim C to prevent articles thrown upon it from rolling off. When the machine is used for cutting straw, the crank C is turned in a direction to impart a rotary motion to the shaft B in the direction indicated by the arrow $f$. The lever-beam E is thus caused to oscillate upon its center by the alternate action of the tappets upon its opposite extremities. The length of the stroke is limited by pins $h$, against which the ascending arm of the lever-beam strikes. When the machine is used for other purposes, one of the pins $h$ is drawn out, the lever-beam is turned into an upright position to bring its arms out of the range of the tappets, and the pin is again inserted to prevent the arms of the lever-beam from dropping within the range of the tappets.

For all other operations than cutting, the shaft B is turned in the direction indicated by the arrow $k$, and the several operations of corn-shelling, crushing, rasping, and grinding are effected, according as the substances are subjected to one or other of the apparatus above described.

What I claim in the foregoing as new, and desire to secure by Letters Patent, is—

The method of cutting vegetable substances by a combined chopping or percussive and shearing cut produced by means of stationary knives at the mouths of the feeding-troughs, moving knives carried on an oscillating lever, and revolving tappets which actuate the oscillating lever, as described.

In testimony whereof I have hereunto subscribed my name.

A. B. EARLE.

Witnesses:
P. H. WATSON,
I. S. SMITH.